United States Patent
Andersen et al.

(10) Patent No.: US 12,361,286 B2
(45) Date of Patent: Jul. 15, 2025

(54) APPARATUS AND METHOD FOR PROCEDURAL TRAINING

(71) Applicant: ProTrainings, LLC, Ada, MI (US)

(72) Inventors: Scott Christopher Andersen, Lowell, MI (US); Adam Matthew Fox, Grand Rapids, MI (US); Jason Edwin Leighton, Portland, OR (US); Mark Steven VanderVoord, Caledonia, MI (US)

(73) Assignee: Pro Trainings, LLC, Ada, MI (US)

( * ) Notice: Subject to any disclaimer, the term of this patent is extended or adjusted under 35 U.S.C. 154(b) by 0 days.

(21) Appl. No.: 18/521,785

(22) Filed: Nov. 28, 2023

(65) Prior Publication Data

US 2024/0119285 A1 Apr. 11, 2024

Related U.S. Application Data

(63) Continuation-in-part of application No. 17/752,357, filed on May 24, 2022, now Pat. No. 11,847,928.

(60) Provisional application No. 63/190,254, filed on May 19, 2021.

(51) Int. Cl.
G09B 19/00 (2006.01)
G06N 3/08 (2023.01)

(52) U.S. Cl.
CPC ............. *G06N 3/08* (2013.01); *G09B 19/003* (2013.01)

(58) Field of Classification Search
CPC ...... G09B 19/003; G09B 23/288; G06N 5/02; G06N 5/048
See application file for complete search history.

(56) References Cited

U.S. PATENT DOCUMENTS

| | | | |
|---|---|---|---|
| 2009/0035740 A1* | 2/2009 | Reed | G09B 23/288 607/5 |
| 2011/0276153 A1 | 11/2011 | Selner | |
| 2015/0099252 A1 | 4/2015 | Anderson et al. | |
| 2016/0287470 A1 | 10/2016 | Lewis et al. | |
| 2017/0368413 A1 | 12/2017 | Shavit | |
| 2018/0374383 A1 | 12/2018 | Thielen et al. | |
| 2021/0019215 A1 | 1/2021 | Neeter | |
| 2021/0304048 A1 | 9/2021 | Stone et al. | |

* cited by examiner

*Primary Examiner* — Peter R Egloff
(74) *Attorney, Agent, or Firm* — Caldwell Intellectual Property Law

(57) ABSTRACT

In an aspect, an apparatus for procedural training is presented. An apparatus includes at least a processor and a memory communicatively connected to at least a processor. A memory contains instructions configuring at least a processor to receive optical data from a sensor comprising a machine vision system in electronic communication with the at least a processor, wherein the machine vision system is configured to identify at least one object within optical data. At least a processor is configured to determine a procedural performance parameter as a function of optical data wherein determining the procedural performance parameter comprises classifying the at least one object within optical data to an optical data category using an optical data classifier. At least a processor is configured to compare a procedural performance parameter to a procedural performance threshold. At least a processor is configured to display procedural training feedback through a display unit as a function of a comparison.

20 Claims, 9 Drawing Sheets

APPARATUS AND METHOD FOR PROCEDURAL TRAINING

CROSS-REFERENCE TO RELATED APPLICATIONS

This application is a continuation-in-part of and claims the benefit of U.S. patent application Ser. No. 17/752,357, filed on May 24, 2022 and titled "AN APPARATUS AND METHOD FOR PROCEDURAL TRAINING" which in incorporated by reference herein in its entirety, which claims the benefit of priority to U.S. Provisional Patent Application Ser. No. 63/190,254 filed on May 19, 2021, and titled "SYSTEM AND METHOD FOR PROVIDING DIGITALLY AUTOMATED CARDIOPULMONARY RESUSCITATION (CPR) TRAINING" which is incorporated by reference herein in its entirety.

FIELD OF THE INVENTION

The present invention generally relates to the field of procedural training. In particular, the present invention is directed to an apparatus and method for procedural training.

BACKGROUND

Many individuals look to become certified in varying procedures, such as cardiopulmonary resuscitation (CPR). However, modern procedural training can be costly and inefficient.

SUMMARY OF THE DISCLOSURE

In an aspect, an apparatus for procedural training is presented. An apparatus includes at least a processor and a memory communicatively connected to at least a processor. A memory contains instructions configuring at least a processor to receive optical data from a sensor comprising a machine vision system in electronic communication with the at least a processor, wherein the machine vision system is configured to identify at least one object within the optical data. At least a processor is configured to determine a procedural performance parameter as a function of optical data wherein determining the procedural performance parameter comprises classifying the at least one object within optical data to an optical data category using an optical data classifier. At least a processor is configured to compare a procedural performance parameter to a procedural performance threshold. At least a processor is configured to display procedural training feedback through a display unit as a function of a comparison.

In another aspect a method of procedural training using a computing device is presented. A method includes receiving optical data from a sensor comprising a machine vision system in electronic communication with a computing device. A method includes identifying, using the machine vision system, at least an object within the optical data. A method includes determining a procedural performance parameter as a function of optical data wherein determining the procedural performance parameter comprises classifying the at least one object within optical data to an optical data category using an optical data classifier. A method includes comparing a procedural performance parameter to a procedural performance threshold. A method includes displaying procedural training feedback to a user through a display unit as a function of a comparison.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Described herein is an apparatus for procedural training. An apparatus may include at least a processor and a memory communicatively connected to the at least a processor. A memory may contain instructions configuring at least a processor to receive optical data from a sensor in electronic communication with the at least a processor. At least a processor may be configured to determine a procedural performance parameter as a function of optical data. At least a processor may be configured to compare a procedural performance parameter to a procedural performance threshold. At least a processor may be configured to display procedural training feedback through a display unit as a function of a comparison.

Described herein is a method of using a computing device for procedural training. A method may include receiving optical data from a sensor in electronic communication with a computing device. A method may include determining a procedural performance parameter as a function of optical data. A method may include comparing a procedural performance parameter to a procedural performance threshold. A method may include displaying procedural training feedback to a user through a display unit as a function of a comparison.

Embodiments illustrating aspects of the present disclosure are described below in the context of several specific examples.

Figure 1:
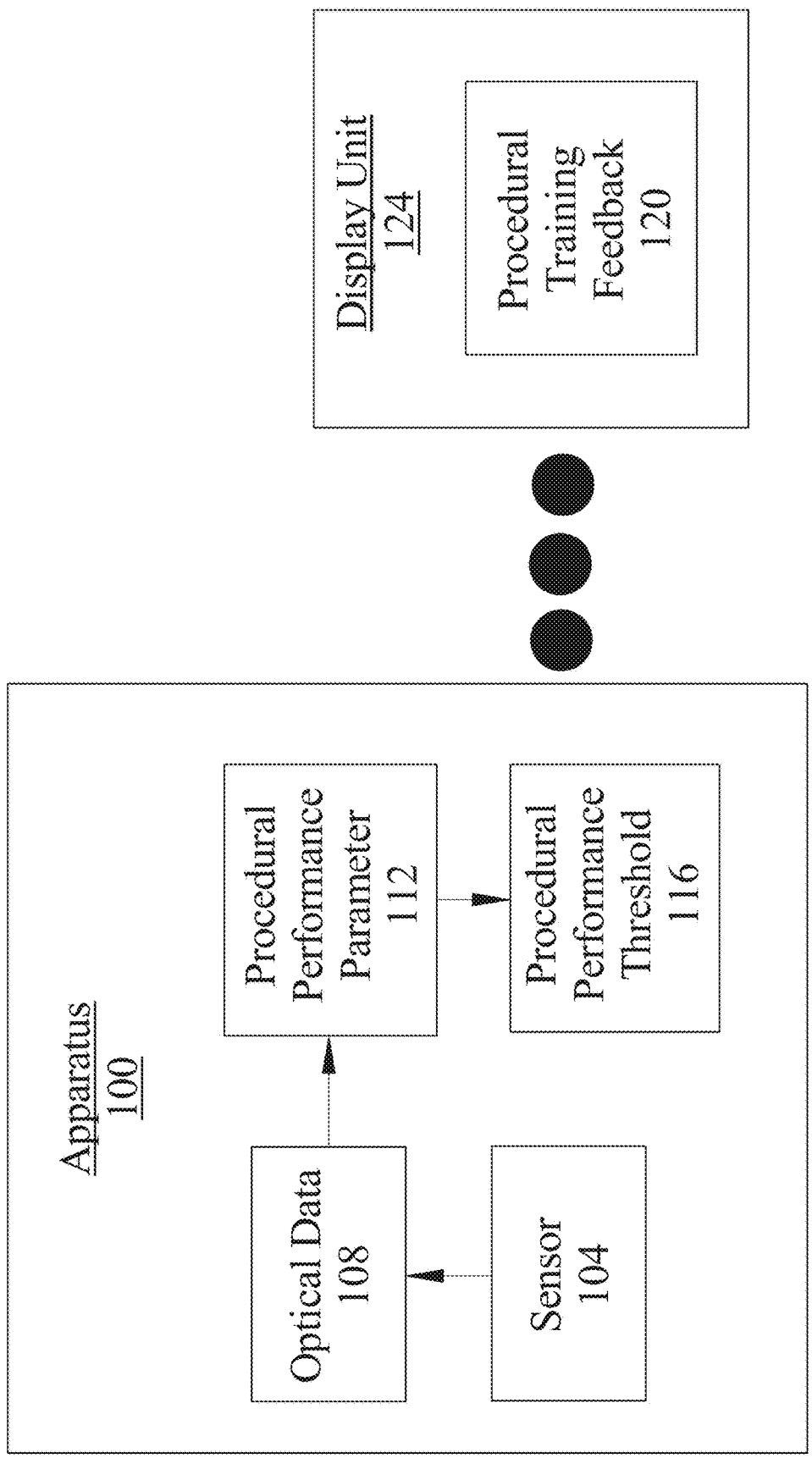
FIG. 1 is an exemplary embodiment of a block diagram of an apparatus for procedural training.

Referring now to FIG. 1, an exemplary embodiment of an apparatus 100 for procedural training is illustrated. Apparatus 100 may include at least a processor and a memory communicatively connected to the at least a processor. A memory may include instructions configuring at least a processor to perform various tasks. As used in this disclosure, "communicatively connected" means connected by way of a connection, attachment or linkage between two or more relate which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. In some embodiments, apparatus 100 may include a computing device. Apparatus 100 may include any computing device as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented using a "shared nothing" architecture in which data is cached at the worker, in an embodiment, this may enable scalability of system 100 and/or computing device.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 may include sensor 104. A "sensor" as used in this disclosure is a device that measures natural phenomenon and transduces the measured natural phenomenon into one or more signals. Sensor 104 may include, without limitation, a camera, infrared sensor, depth sensor, Lidar sensor, time-of-flight sensor, and the like. In some embodiments, sensor 104 may include, without limitation, one or more photodetectors, a charge-coupled device (CCD), photoresistor, photodiode, avalanche photodiode, single photon avalanche diode, photocapacitor, phototransistor, photovoltaic devices, and the like. Sensor 104 may be in electronic communication with at least a processor of apparatus 100. "Electronic communication" as used in this disclosure is a shared data connection between two or more devices. In some embodiments, sensor 104 may include audio input devices, such as, but not limited to, microphones. In some embodiments, sensor 104 may include impact detection devices, such as, but not limited to, accelerometers, load cells, and the like. Sensor 104 may be configured to measure audio data in addition to optical data 108. "Audio data" as used in this disclosure is a metric pertaining to sounds. Audio data may include, but is not limited to, frequency, amplitude, and the like. In some embodiments, audio data may include speech and/or other sounds originating from an individual. Sensor 104 may be in electronic communication via a wired and/or wireless connection to at least a processor of apparatus 100. In some embodiments, apparatus 100 may include two or more sensors 104.

Still referring to FIG. 1. in some embodiments, sensor 104 may include, but is not limited to, a smartphone camera, laptop camera, webcam, and the like. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image. Sensor 104 may be configured to generate optical data 108. "Optical data" as used in this disclosure is information pertaining to visual phenomenon. For instance and without limitation, optical data 108 may include color, contrast, motion, sharpness, blurriness, and the like. Optical data 108 may include, without limitation, images, videos, and the like. In some embodiments, optical data 108 may include image data as described above. In some embodiments, optical data 108 may include real-time video recordings of one or more individuals. For instance and without limitation, optical data 108 may include real-time video of an individual performing a procedure.

Still referring to FIG. 1, in some embodiments, apparatus 100 may include a machine vision system that includes sensor 104. A machine vision system may use images from sensor 104, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and q may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1, in some embodiments, apparatus 100 may determine optical data 108 to include dimensions of objects and/or people, such as, but not limited to, length, height, width, volume, and the like. For instance and without limitation, apparatus 100 may determine that optical data 108 may include a height of an individual of 5 feet 10 inches. In some embodiments, apparatus 100 may determine skeletal data of optical data 108. "Skeletal data" as used in this disclosure is information pertaining to an individual's bones and/or joints. Skeletal data may include, but is not limited to, bone orientation, bone density, bone length, bone width, bone symmetry, and the like. As a non-limiting example, apparatus 100 may determine that optical data 108 may include a chest size of an individual, such as 40 inches. Apparatus 100 may determine that optical data 108 may include dimensions of a hand of an individual, such as, but not limited to, arm length, finger length, finger width, hand size, palm width, palm length, and the like. In some embodiments, apparatus 100 may determine that optical data 108 may include dimensions of a facial structure. Dimensions of a facial structure may include, but are not limited to, jaw length, jaw depth, nose length, nose width, mouth width, mouth height, and the like. In some embodiments, apparatus 100 may determine a gender of an individual through optical data 108. For example and without limitation, apparatus 100 may determine, based on a skeletal analysis of an individual's chest, waist, hips, height, volume, and the like, that an individual may be female. In some embodiments, apparatus 100 may determine an age of an individual. An age may include an estimated age, a range of ages, and the like. Apparatus 100 may determine a relative age based on a skeletal analysis of an individual. For instance and without limitation, apparatus 100 may determine an individual may be between 25 and 30 years old based on height, posture, facial structure, and the like. As another non-limiting example, apparatus 100 may determine an individual may be a toddler, infant, geriatric, and the like based on heights, postures, facial structures, and the like. Apparatus 100 may determine information about optical data 108 using a machine learning model and/or feature learning as described below, without limitation.

Still referring to FIG. 1, in some embodiments, apparatus 100 may utilize a machine vision system to analyze and/or determine information of optical data 108. In some embodiments, apparatus 100 may utilize a feature learning algorithm to determine one or more features of optical data 108. A "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of sets of optical data, as defined above, with each other. As a non-limiting example, feature learning algorithm may detect co-occurrences of skeletal data with each other. Apparatus 100 may perform a feature learning algorithm by dividing optical data from a given sensor into various sub-combinations of such data to create optical data sets as described above, and evaluate which optical data sets tend to co-occur with which other optical data sets; for instance, where optical data includes skeletal data, apparatus 100 may divide each skeletal datum into individual skeletal datums and evaluate which individual skeletal datums and/or combinations thereof tend to co-occur with which other individual skeletal datums, and/or other optical data. In an embodiment, first feature learning algorithm may perform clustering of data.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance an optical data training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DB SCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of skeletal dimensions with multiple ages, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device may generate a k-means clustering algorithm receiving unclassified optical data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related optical data, which may be provided with skeletal models; this may, for instance, generate an initial set of skeletal models from an initial set of optical data of a large number of users, and may also, upon subsequent iterations, identify new clusters to be provided new skeletal models, to which additional optical data may be classified, or to which previously used optical data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $argmin_{c_i \in C} \, dist(c_i, x)^2$, where argmin includes argument of the minimum, ci includes a collection of centroids in a set $C$, and dist includes standard Euclidean distance. K-means clustering module may then recompute centroids by taking mean of all cluster data entries assigned to a centroid's cluster. This may be calculated based on $c_i = 1/|S_i| \Sigma \, x_i \ni S_i^{x_i}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected optical data set. Degree of similarity index value may indicate how close a particular combination of skeletal data and/or facial structures is to being classified by k-means algorithm to a particular cluster. K-means clustering algorithm may evaluate the distances of the combination of skeletal data and/or facial structures to the k-number of clusters output by k-means clustering algorithm. Short distances between a set of optical data and a cluster may indicate a higher degree of similarity between the set of optical data and a particular cluster. Longer distances between a set of optical data and a cluster may indicate a lower degree of similarity between an optical data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between am optical data set and the data entry cluster. Alternatively or additionally k-means clustering algorithm may select a plurality of clusters having low degree of similarity index values to optical data sets, indicative of greater degrees of similarity. Degree of similarity index values may be compared to a threshold number indicating a minimal degree of relatedness suitable for inclusion of a set of optical data in a cluster, where degree of similarity indices a-n falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure.

Still referring to FIG. 1, in some embodiments, apparatus 100 may be configured to classify optical data 108. Apparatus 100 may utilize a machine vision system to classify optical data 108. In some embodiments, apparatus 100 may utilize an optical data classifier to classify optical data 108 to one or more groups. An "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Apparatus 100 and/or another device may generate a classifier using a classification algorithm, defined as a processes whereby a computing device derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, apparatus 100 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Apparatus 100 may then calculate a likelihood table by calculating probabilities of different data entries and classification labels. Apparatus 100 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, apparatus 100 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, an "optical data classifier" as used in this disclosure is a machine learning model that categorizes optical data to categories and/or subcategories. An optical data classifier may be trained with training data correlating optical data to optical data groups and/or subgroups. Training data may be received through user input, external computing devices, and/or previous iterations of processing. An optical data classifier may input optical data 108 and output groups and/or subgroups of optical data, such as, but not limited to, objects, clothes, individuals, genders, ages, and the like. For instance and without limitation, apparatus 100 may use an optical data classifier to classify optical data 108 to age groups of individuals, such as infant, toddler, teenager, adult, elderly, and the like. In some embodiments, apparatus 100 may use an optical data classifier to classify skeletal data to subgroups, such as, but not limited to, arm bones, leg bones, shoulder blades, necks, ribcages, sternums, foot bones, and the like. In some cases optical data classifier may classify objects such as manikins to subgroups, such as particular models of manikins having differing shapes, sizes, brands, requirements and the like. In some cases, optical data classifier may be used to determine a particular user within optical data, a particular object within optical data and the like.

Still referring to FIG. 1, apparatus 100 may be configured to determine procedural performance parameter 112. In some embodiments, apparatus 100 may determine procedural performance parameter 112 as a function of optical data 108. A "procedural performance parameter" as used in this disclosure is a metric pertaining to one or more steps of a procedure. A "procedure" as used in this disclosure is a process having one or more steps. A procedure may include, but is not limited to, medical procedures, athletic procedures, sign language procedures, and the like. Medical procedures may include, without limitation, the Heimlich maneuver, seizure protocols, basic life support (BLS), advanced cardiovascular life support (ACLS), EpiPen administration, phlebotomy procedures, pediatric advanced life support (PALS), tracheotomy procedures, tourniquet procedures, and the like. In some embodiments, a medical procedure may include cardiopulmonary resuscitation (CPR). In some embodiments, apparatus 100 may be configured to determine procedural performance parameter 112 as a function of a procedural performance machine learning model. A procedural performance machine learning model may be trained on training data correlating optical data to procedural performance parameters. Training data may be received through user input, external computing devices, and/or previous iterations of processing. In some embodiments, training data may be generated through data gathered by wearable sensors. For instance and without limitation, an individual may perform CPR on a manikin while wearing a pressure sensor on a glove. Training data may be generated through camera data correlating wearable sensor data to image data. In some embodiments, training data may include a multi-color light broadcast which may be received and decoded into sensor data. Training data may be generated from depth sensors positioned on manikins. A procedural performance machine learning model may be configured to input optical data and output procedural performance parameters.

Still referring to FIG. 1, in some embodiments, procedural performance parameter 112 may include data related to, without limitation, one or more steps of CPR. Procedural performance parameter 112 may include, but is not limited to, hand orientations. "Hand orientations" as used in this disclosure are positioning of hands. Hand orientations may include positioning of an individual's hand relative to a second hand of the individual. For instance and without limitation, a left hand may be placed on a right hand, and vice versa. Hand orientations may include finger orientations. For instance and without limitation, finger orientations may include positioning of an individual's fingers relative to one or more other fingers of the individual. As a non-limiting example, fingers of a left hand of an individual may be positioned within spaces between fingers on a right hand of the individual. In some embodiments, hand orientations may include an angle of a wrist bend. For instance and without limitation, an angle of a wrist bend may include 30 degrees clockwise. Hand orientations may include hand poses, such as, but not limited to, crossed fingers, open palm, two finger extensions, and the like. Hand poses may correlate to varying CPR procedures. For example and without limitation, CPR of an adult may require a two handed pose, CPR of a child may require a single hand pose, and CPR of an infant may include a two finger pose.

Still referring to FIG. 1, in some embodiments, procedural performance parameter 112 may include hand placements. "Hand placements" as used in this disclosure are positioning of hands on a surface of an object and/or entity. Hand placements may include positioning of an individual's hands on top a chest of another individual, object, and the like. For instance and without limitation, a hand positioning may include an alignment of hands on a sternum of a chest of an individual and/or manikin. Hand placements may include measurements such as, but not limited to, inches, centimeters, millimeters, and the like. Hand placements may include coordinates along an x axis, y axis, and/or z axis. As a non-limiting example, a hand placement may include a palm of an individual's hand aligned 2 inches to the right of a sternum of an individual and/or manikin.

Still referring to FIG. 1, in some embodiments, procedural performance parameter 112 may include arm orientations. An "arm orientation" as used in this disclosure is a positioning of an upper limb of an entity. An arm orientation may include positioning of an individual's arm. For instance and without limitation, a left arm of an individual may be crossed over a right arm of an individual, and vice versa. In some embodiments, arm orientation may include a positioning of an individual's arm relative to their chest. For instance and without limitation, an arm orientation may include an angle of 45 degrees between a pair of arms of an individual and a chest of the individual. Arm orientation may include elbow positioning. Elbow positioning may include a position of an individual's elbows relative to their arm. In some embodiments, elbow positioning may include a degree of bend. For instance and without limitation, a degree of bend of an elbow may include 15 degrees between a bicep and forearm of an individual.

Still referring to FIG. 1, in some embodiments, procedural performance parameter 112 may include chest compression data. "Chest compression data" as used in this disclosure is information pertaining to a contraction and/expansion of a breast of an individual. Chest compression data may include chest compression force. Chest compression force may be measured in newtons, pounds, and the like. Chest compression force may include a force applied to an individual and/or manikin receiving CPR. For instance and without limitation, chest compression force may include 60 lbs of force applied to an individual's chest. In some embodiments, chest compression data may include chest compression depth. Chest compression depth may include a displacement of a chest of an individual. For instance and without limitation, chest compression depth may include 1.5 inches downwards from a resting point of a chest. In some embodiments, chest compression data may include chest compression frequency. Chest compression frequency may include a quantity of chest compressions given divide by a unit of time. For instance and without limitation, chest compression frequency may include a frequency of 1.6 chest compressions a second. In some embodiments, chest compression data may include chest compression pressure. Chest compression pressure may include an amount of force applied over an area of a chest. Chest compression pressure may be measured in pascals, pounds per square inch, and the like. For instance and without limitation, chest compression pressure may include 100 lbs of force per square inch. In some embodiments, chest compression data may include a quantity of chest compressions. A quantity of chest compressions may include a sum total of chest compressions given over a period of time. For instance and without limitation, chest compression quantity may include 200 chest compressions. In some embodiments, chest compression data may include a chest compression rate. A chest compression rate may include a quantity and/or number of chest compressions per unit of time. For instance and without limitation, a chest compression rate may include a rate of 2 chest compressions a second.

Still referring to FIG. 1, in some embodiments, procedural performance parameter 112 may include respiratory data. "Respiratory data" as used in this disclosure is information pertaining to lung functions of an individual. Respiratory data may include a quantity of breaths administered, such as, but not limited to, during mouth-to-mouth resuscitation. A quantity of breaths administered may include a sum total of breaths administered over a period of time. For instance and without limitation, a quantity of breaths administered may include 2 breaths a minute. Respiratory data may include breath pressure, such as 1-15 psi.

Still referring to FIG. 1, in some embodiments, procedural performance parameter 112 may include AED data. "AED data" for the purposes of this disclosure is data pertaining to action or event associated with an automated external defibrillator (AED) AED data may include the position of the AED device relative to a user and/or a manikin, the holding of the device, the checking a manikins heart rhythm prior to placing the AED device, the placement of the device, the usage of the device and the like.

Still referring to FIG. 1, in some embodiments, apparatus 100 may utilize a machine vision system as described above to determine procedural performance parameter 112. For instance and without limitation, apparatus 100 may use a machine vision system to identify and separate individuals from objects, backgrounds, and the like of video recordings and/or images of optical data 108. In some embodiments, apparatus 100 may be configured to perform a pose estimation technique. A "pose estimation technique" as used in this disclosure is a computer vision process of predicting and tracking a location of an individual or object. A pose estimation technique may include, but is not limited to, bottom-up approaches, top-down approaches, 2D pose estimation, 3D pose estimation, and the like. In some embodiments, a pose estimation technique may include, without limitation, kinematic models, planar models, and/or volumetric models. Apparatus 100 may be configured to utilize a pose estimation machine learning model. A pose estimation machine learning model may be trained with training data correlating optical data to pose estimations. Training data may be received from user input, external computing devices, and/or previous iterations of processing. A pose estimation machine learning model may input optical data 108 and output pose estimations. In some cases, pose estimations may include the location of an individual's hand, the pose of the particular individual, the post of the individual in reference to an object such as a mannequin and the like. Apparatus 100 may be configured to perform a skeletal analysis of motion of one or more individuals. A skeletal analysis of motion may include generating a skeleton-based model of an individual. A skeleton-based model may include one or more sets of key points of kinematic analysis, such as but not limited to ankles, knees, shoulders, elbows, wrists, and/or limb orientations. Apparatus 100 may be configured to utilize a skeletal analysis machine learning model. A skeletal analysis machine learning model may be trained with training data correlating optical data to skeletal analysis. Training data may be received through user input, external computing devices, and/or previous iterations of processing. A skeletal analysis machine learning model may be configured to input optical data and output skeletal analysis. Apparatus 100 may utilize a skeletal analysis of motion to determine and/or predict procedural performance parameter 112 such as, but not limited to, positioning, dimensions, and the like. For instance and without limitation, procedural performance parameter 112 may include data related to hand positioning of an individual. Hand positioning may include an alignment of hands, fingers, palms, and the like. In some embodiments, hand positioning may include positioning relative to another object or individual. For instance and without limitation, hand positioning may include an alignment of one or more hands on top a chest of an individual.

With continued reference to FIG. 1, objects identified by machine vision system may be used to identify manikins within optical data 108. In an embodiment, optical data classifier may classify a manikin within optical data 108 to a particular subgroup of manikins. In some cases, at least one object within optical data may be classified to an optical data category using an optical data classifier. Objects may include a user, a body part related to a user, components and/or articles of clothing associated with a user, a manikin and any other objects that may be classified using optical data classifier. Apparatus 100 may use the classification to determine the particular CPR requirements for the manikin. For example, a taller manikin may require stronger chest compressions, deeper chest compressions, and other CPR related actions. In some cases, apparatus 100 may use the classification to determine the presence of an individual within a physical space and components associated with the individual. For example, optical data classifier may classify an object as a user, wherein the classification may be used to determine that a user is present within a particular space.

With continued reference to FIG. 1, pose estimation technique may be used to determinate a first position of an object and/or individual and determine a second position of an object and/or individual. Apparatus 100 may make determinations as a function of the first position and the second position. For example, apparatus 100 may determine a location of an individual in a first position and a location of an individual in a second position wherein a change in distance between the first position and the second position may signify the start or end of an action. For example, a first position may indicate the start of a CPR compression wherein the second position may indicate the end of the CPR compression. Apparatus 100 may identify a body part associated with an individual and/or any components associated with an individual in order to determine a change in distance between a first position and a second position. For example, apparatus 100 may use the shoulder of an individual to determine the first position of the individual, a second position of the individual and the change in distance between a first position and a second position. In some cases, apparatus may identify an object, component and/or a body part associated with an individual in a first position and a second position and determine a change in distance between the first position and the second position. In some cases, apparatus 100 may use markers to determine a change in distance between a first position and a second position. "Markers" for the purposes of this disclosure are physical objects that a computing device may identify within a scene to make determinations about the scene. For example, a sticker on an individual may be used as a marker, wherein a computing device may identify the marker and make determinations about a scene. In some cases, apparatus 100 may identify, using a machine vision system as described herein, a marker in a first portion and a marker in a second position wherein apparatus 100 may make determinations, such as determining a procedural performance parameter 112 based on the markers. Markers may include any physical objects within a space that may be used to make determinations within a scene. Markers may include an object with a unique color within a scene, wherein changes in the position of the object may be used to make determinations. In some cases, markers may include tape, a particular object, a sticker, a marking, and the like. In some cases, apparatus 100 may make determinations as a function of the first position and the second position. In some cases, apparatus 100 may determine the time length of a compression by determining the difference in time between a first position and the second position. In some cases, apparatus 100 may determine actions a particular user is taking, such as an action involving a user moving in the direction of a manikin in order to perform CPR rescue breaths. In some cases, apparatus 100 may further make determinations of the posture of an individual relative to the manikin, the actions a user takes. and the like. In some cases, apparatus 100 may determine whether a user is tilting the head of a manikin properly or engaging in mouth to mouth properly. In some cases, apparatus 100 may determine a depth of compression associated with chest compression data (described above) by determining a change in location of a portion of a user's body (e.g. a user's hand) in a first position and in a second position. In some cases pose estimation technique may be used to determine a plurality of positions wherein the plurality of positions may be used to determine an action taken by an individual. For example, plurality of positions may be used to indicate the number of compressions that a user achieved, the time length of each compression, an average time length of all the compressions, the average depth of compression for each compression, how often the user performed mouth-to-mouth breathing, the time between each compression, any other CPR related actions.

With continued reference to FIG. 1, in some cases, post estimation technique may be used to determine an action of an individual during CPR training. For example, post estimation technique may be used to track an individual's movements whereby each movement may be associated with a particular movement necessary for CPR training. In some cases, pose estimation technique may track an individual's movements associated to CPR training such as for example, movements related to chest compression, movement related to mouth breathing, and the like.

In some cases, determining procedural performance parameter 112 may include determining a plurality of CPR Parameters. "Plurality of CPR parameters" is data consisting of various poses and/or actions of an individual that may be used to determine an individual actions during a CPR related training. For example, CPR parameters may include data indicating a particular position a user is in (e.g. pre-compression during CPR, in middle of a compression, after the compression, mouth to mouth given, and the like) how fast a user is performing the CPR technique, the hand orientation of the individual during the CPR training, the force applied by the individual, the steps taken during the training and the like. Plurality of CPR parameters may include the depth of compression exerted by an individual associated with chest compression data. Depth of compression may include the amount of pressure applied onto an object such as a mannequin or a human. For example, a user may apply a force onto an object, such as a mannequin, wherein the force may cause the object to compress a particular distance. In some cases, plurality of CPR parameters may be determined using a CPR machine learning model. In some cases, training data may be received wherein the training data includes a plurality of optical data 108 correlated to a plurality of CPR parameters. In an embodiment, a particular optical data 108 may be correlated to a particular CPR parameter. For example, a particular optical data 108 may be used to determine a particular CPR parameter such as particular depth of compression. In some cases, optical data 108 may include more than one images or multiple frames within a video wherein each image may be associated with a particular CPR parameter. Additionally or alternatively, a CPR machine learning model may be trained using training data as described above and a plurality of CPR parameters may be determined as a function of the CPR machine learning model. In some cases, optical data 108 may include more than one images or more than one frames of a video wherein each image or frame may be correlated to a specific CPR parameter. In some cases, apparatus 100 may determine an initial uncompressed stage wherein a user has not begun compression, a mid-compression stage wherein a user may be in the middle of compression and a final compression stage wherein a user has finished one compression. Apparatus 100 may determine the change in depth by determining the change in a first CPR parameter associated with a start of a compression, in comparison to a second CPR parameter associated with a mid-compression stage. In some cases, apparatus 100 may determine the speed of the compressions by determining a change in time between a first CPR parameter associated with a start of a compression and a third CPR parameter associated with the end of a compression.

In some cases, determining procedural performance parameter 112 may include calibrating apparatus 100 based on optical data 108. "Calibration" is the process of configuring an instrument and/or component by comparing it to a known standard. A device may be calibrated in order to provide measurements based on the known standard. For example, a device may be calibrated by receiving a known dimension of an object within an image and using the known dimensions to determine the dimensions of an unknown object within the same image. In some cases, calibrating may include determining an aspect ratio based on the perceived size of the known object and the actual size of the known object. Then, the perceived size of the unknown object is measured and using the aspect ratio calculated, the actual size of the unknown object is determined. In some cases, an image such as an image within optical data 108 may contain calibration points wherein the distance between two or more calibration points is known. A computing device and/or apparatus 100 may then make determinations based on the perceived distance between two calibration points and the actual distance between two calibration points. For example, an object may contain a first calibration point and a second calibration point wherein the distance between the first calibration point and the second calibration point is known. In some cases, a manikin may contain one or more calibration points wherein a computing device and/or apparatus 100 may use machine vision system to determine the manikin within the image and receive the corresponding distance between the two calibration points within the image. Apparatus 100 may use a lookup table to lookup a particular brand of manikin and the corresponding distance between two calibration points.

With continued reference to FIG. 1, in some cases machine vision system may detect an upper body landmark in order to determine a procedural performance parameter 112. An "upper body landmark" for the purposes of this disclosure is a point on an upper body of a user that may be used to determine the action of the user. For example, an upper body landmark may include a wrist wherein detection of the wrist and the movement of the wrist may indicate a particular action such as chest compression. An upper body landmark may include any area on a user's body, or any components worn by the user that may be used to determine an action by the user. This may include but is not limited to a shoulder, elbow, wrist, a watch worn by the user, a ring and the like. Machine vision system may detect an upper body landmark to make determinations about a scene. For example, movement of a shoulder from a first image to a second image may indicate a particular form that the user is using in while conducting CPR. In another non limiting example, movement of a shoulder from a first position to a second position may indicate the depth of compression during a chest compression, the speed of the compression, the number of compressions and any other data that may be used for chest compression data. In some cases, apparatus 100 and/or a computing device may further utilize the skeletal analysis described above to determine proper form during the compression such as locked elbows, the angle of a user's arm or wrist on the manikin and the like. In some cases, upper body landmarks may be marked physically on a user. For example, a marker, as described above, may be placed on a particular upper body landmark of a user, wherein apparatus 100 may identify the marker and make determinations based on the marker. In some cases, a user may be marked with a pen, a writing instrument, a coloring instrument and/or the like, wherein apparatus 100 may identify the marking in order to make determinations of a scene. In some embodiments, apparatus 100 may track markers using machine vision. In some embodiments, markers may be luminescence. In some embodiments, apparatus 100 may use this luminescence to track the position of markers. In some cases, apparatus 100 may be configured to identify a marker within a scene and make determination based on the identification of the marker, such as determining a procedural performance parameter 112.

With continued reference to FIG. 1, apparatus 100 and/or computing device may use triangulation to determine the distance of a user to a particular object in order to make determinations about a scene and determine procedural performance parameter 112 as described above. "Triangulation" for the purposes of this disclosure is the process of determining a distance or location between of a point or between two points using two already known points. For example, apparatus 100 and/or computing device may use lidar to determine the distance between a first point in a physical space and the distance between a second point in physical space and use triangulation to determine an unknown distance in a physical space such as the distance between a user and the manikin. Triangulation may include measuring the distance between a camera and a first object, such as a user, measuring a distance between a camera and a second object, such as a manikin, and determining the distance between the user and the manikin. In some cases, apparatus 100 and/or computing device may determine a distance between an upper body landmark and a point on a manikin for use in CPR training. In some cases computing device may use triangulation using two already known points in an image, such as for example, two calibration points.

With continued reference to FIG. 1, determining procedural performance parameter may include determining an action associated with an AED training. An action associated with AED training may be received as AED data AED data may be determine using calibration, triangulation and any other techniques, described in this disclosure to used determine an action or a procedural performance parameter 112.

Still referring to FIG. 1, apparatus 100 may determine kinetics of procedural performance parameter 112. "Kinetics" as used in this disclosure is information pertaining to movement. Kinetics may include, but are not limited to, force, pressure, acceleration, rotations, and the like. Procedural performance parameter 112 may include a force applied from one individual to another individual. For example, in a CPR process, procedural performance parameter 112 may include pressure applied from one or more hands of a first individual to a chest of a second individual receiving CPR. For example and without limitation, procedural performance parameter 112 may include a pressure of 120 lbs. per square inch. Procedural performance parameter 112 may include an acceleration of an individual, such as an individual's acceleration of their arms and/or hands. For example procedural performance parameter 112 may include an acceleration of one or more hands of an individual, such as 4 cm/s. In some embodiments, procedural performance parameter 112 may include rotations of an individual. For example, procedural performance parameter 112 may include a rotation of a head of an individual receiving CPR, such as 10 degrees clockwise. In some embodiments, procedural performance parameter 112 may include depth data. "Depth data" as used in this disclosure is information pertaining to a distance of a top of an object or entity to a bottom of an object or entity. Depth data may include, but is not limited to, compression depth, decompression depth, chest depth, and the like. For instance and without limitation, depth data may include a compression depth of a chest of an individual of 2 inches. In some embodiments, procedural performance parameter 112 may include a frequency of an action. A frequency of an action may include, without limitation, chest compressions, breaths administered, and the like. As a non-limiting example, performance parameter 112 may include a frequency of about 100 to 120 chest compressions per minute. In some embodiments, apparatus 100 may be configured to utilize a kinetic machine learning model. A kinetic machine learning model may be trained with training data correlating procedural performance parameters and/or optical data to kinetics. Training data may be received through user input, external computing devices, and/or previous iterations of processing. Apparatus 100 may utilize a kinetic machine learning model to determine kinetics of procedural performance parameter 112. In some embodiments, each machine learning model described above may be combined into a single machine learning model. In other embodiments, each machine learning model described above may be separate from one another.

Still referring to FIG. 1, apparatus 100 may be configured to compare procedural performance parameter 112 to procedural performance threshold 116. A "procedural performance threshold" as used in this disclosure is a value constraining a procedure. Procedural performance threshold 116 may include values such as, but not limited to, quantity of chest compressions, time between chest compressions, depth of chest compressions, pressure of chest compressions, and the like. For instance and without limitation, procedural performance threshold 116 may include a depth of between 2 inches and 2.4 inches. In some embodiments, procedural performance threshold 116 may include an ideal performance parameter. An "ideal performance parameter" as used in this midcourse is an optimal metric of a procedure. For instance and without limitation, an ideal performance parameter may include a frequency of chest compressions, a depth of chest compression, pressure of a chest compression, hand orientation, arm orientation, recipient head positioning, and the like. Procedural performance threshold 116 may be determined by apparatus 100 through an ideal performance parameter machine learning model. An ideal performance parameter machine learning model may be trained with training data correlating procedural performance parameters to ideal performance parameters. Training data may be received through user input, external computing devices, and/or previous iterations of processing. An ideal performance parameter machine learning model may be configured to input procedural performance parameters and output ideal performance parameters. Apparatus 100 may use an ideal performance parameter machine learning model to determine procedural performance threshold 116. In some embodiments, procedural performance threshold 116 may include a fuzzy set, one or more parameters and/or coefficients of a fuzzy set, a centroid or other geometric element of a fuzzy set and/or defuzzification threshold. For instance and without limitation, procedural performance threshold 116 may include a fuzzy set coefficient, centroid, and the like. In some embodiments, comparing procedural performance parameter 112 to procedural performance threshold 116 may include determining a degree of fuzzy set membership and/or any application of any fuzzy inferencing system as described in this disclosure, such as described below with reference to FIG. 6. Any threshold, process for comparison, and/or parameters thereof, including without limitation any coefficient and/or other parameter of a fuzzy set, TSK function, fuzzy inferencing system, or the like may be tuned using a machine learning model, which may include any model as described herein, which may be trained with training data associating parameters to examples included in and/or excluded from "correct" ranges, and/or representing "ideal" parameters. Training examples may include input from experts, data obtained through recordation of successful applications of CPR, and the like. In some cases, procedural performance threshold 116 may include predetermined values associated with any datum within procedural performance parameter 112. For example, procedural performance threshold may include a predetermined value for chest compressions within chest compression data or a value associated with depth of compressions within chest compression data. In some cases, the predetermined value are optimal values wherein procedural performance 112 parameter is compared to the optimal value to determine how well and/or correctly a user is involved in an action or procedure.

Still referring to FIG. 1, in some embodiments, apparatus 100 may communicate with a procedural database. A "procedural database" as used in this disclosure is a collection of information pertaining to a procedure. In some embodiments, a procedural database may include, but is not limited to, medical databases, professional databases, and the like. In some embodiments, apparatus 100 may generate a procedural database through iterations of processing. A database may be implemented, without limitation, as a relational database, a key-value retrieval database such as a NOSQL database, or any other format or structure for use as a database that a person skilled in the art would recognize as suitable upon review of the entirety of this disclosure. A database may alternatively or additionally be implemented using a distributed data storage protocol and/or data structure, such as a distributed hash table or the like. A database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

In some embodiments, and still referring to FIG. 1, apparatus 100 may use an objective function to compare measured performance 112 to performance parameter 116. An "objective function" as used in this disclosure is a process of minimizing or maximizing one or more values based on a set of constraints. Apparatus 100 may generate an objective function to optimize a comparison of procedural performance parameter 112 to procedural performance threshold 116. In some embodiments, an objective function of apparatus 100 may include an optimization criterion. An optimization criterion may include any description of a desired value or range of values for one or more attributes of a procedural performance parameter; desired value or range of values may include a maximal or minimal value, a range between maximal or minimal values, or an instruction to maximize or minimize a procedural performance parameter. As a non-limiting example, an optimization criterion may specify that a procedural performance parameter should include at least 100 chest compressions a minute; an optimization criterion may cap a difference of a procedural performance parameter and a performance parameter threshold, for instance specifying that a procedural performance parameter must not have a difference from a performance parameter threshold greater than a specified value. An optimization criterion may specify one or more tolerances for differences in procedural performance parameters. An optimization criterion may specify one or more desired performance criteria for a procedural performance threshold. In an embodiment, an optimization criterion may assign weights to different procedural performance parameters or values associated with procedural performances; weights, as used herein, may be multipliers or other scalar numbers reflecting a relative importance of a particular procedural performance parameter or value. One or more weights may be expressions of value to a user of a particular outcome, performance value, or other facet of a matching process. As a non-limiting example, minimization of differences of a procedural performance parameter and one or more procedural performance thresholds may be multiplied by a first weight, while tolerance above a certain value may be multiplied by a second weight. Optimization criteria may be combined in weighted or unweighted combinations into a function reflecting an overall outcome desired by a user; a function may be a procedural performance parameter function to be minimized and/or maximized. A function may be defined by reference to performance criteria constraints and/or weighted aggregation thereof as provided by apparatus 100; for instance, a procedural performance parameter function combining optimization criteria may seek to minimize or maximize a function of a procedural performance.

Still referring to FIG. 1, apparatus 100 may use an objective function to compare procedural performance parameter 112 to performance parameter threshold 116. Generation of an objective function may include generation of a function to score and weight factors to achieve a performance score for each feasible pairing. In some embodiments, pairings may be scored in a matrix for optimization, where columns represent procedural performance parameters and rows represent performance parameter thresholds potentially paired therewith; each cell of such a matrix may represent a score of a pairing of the corresponding procedural performance parameter to the corresponding performance parameter threshold. In some embodiments, assigning a predicted process that optimizes the objective function includes performing a greedy algorithm process. A "greedy algorithm" is defined as an algorithm that selects locally optimal choices, which may or may not generate a globally optimal solution. For instance, apparatus 100 may select pairings so that scores associated therewith are the best score for each procedural performance parameter match and/or for each performance parameter threshold. In such an example, optimization may determine the combination of procedural performance parameters matches such that each procedural performance parameter pairing includes the highest score possible.

Still referring to FIG. 1, an objective function may be formulated as a linear objective function. Apparatus 100 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all procedural performance parameters r, S is a set of all performance parameter thresholds s, $c_{rs}$ is a score of a pairing of a given procedural performance parameter with a given match, and $x_{rs}$ is 1 if a procedural performance parameter r is paired with a performance parameter threshold s, and 0 otherwise. Continuing the example, constraints may specify that each procedural performance parameter is assigned to only one procedural performance threshold, and each procedural performance threshold is assigned only one procedural performance parameter. Procedural performance parameters and procedural performance thresholds may be as described above. Sets of procedural performance parameters may be optimized for a maximum score combination of all generated procedural performance parameters. In various embodiments, apparatus 100 may determine a combination of procedural performance parameters that maximizes a total score subject to a constraint that all procedural performance parameters are paired to exactly one performance parameter threshold. Not all procedural performance parameters may receive a procedural performance threshold pairing since each procedural performance parameter may only produce one procedural performance threshold. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on apparatus 100 and/or another device, and/or may be implemented on third-party solver.

With continued reference to FIG. 1, optimizing an objective function may include minimizing a loss function, where a "loss function" is an expression an output of which an optimization algorithm minimizes to generate an optimal result. As a non-limiting example, apparatus 100 may assign variables relating to a set of parameters, which may correspond to score procedural performance parameters as described above, calculate an output of mathematical expression using the variables, and select a pairing that produces an output having the lowest size, according to a given definition of "size," of the set of outputs representing each of plurality of procedural performance parameter combinations; size may, for instance, included absolute value, numerical size, or the like. Selection of different loss functions may result in identification of different potential pairings as generating minimal outputs. Objectives represented in an objective function and/or loss function may include minimization of differences between procedural performance parameters and procedural performance thresholds. Objectives may include minimization of time in between chest compressions of a procedural performance parameter.

Objectives may include maximization of scores of procedural performance parameters.

Still referring to FIG. 1, apparatus 100 may use an objective function to compare procedural performance parameter 112 to performance parameter threshold 116. Apparatus 100 may be configured to evaluate an objective function, such as an objective function described above, to compare procedural performance parameter 112 to procedural performance threshold 116. Evaluating an objective function may include minimizing, maximizing, and/or optimizing the objective function. As a non-limiting example, apparatus 100 may compare a positioning of hands of procedural performance parameter 112 an ideal positioning of hands of performance parameter threshold 116. In some embodiments, apparatus 100 may compare procedural performance parameter 112 to a pre-selected performance parameter threshold 116 to determine an overall score of procedural performance parameter 112. In some embodiments, apparatus 100 may determine performance parameter thresholds 116 based on previous iterations of processing, other user performances, and the like. Performance parameter threshold 116 may be tuned by a machine learning model, such as a machine learning model described in FIG. 5.

Still referring to FIG. 1, in some embodiments, apparatus 100 may be configured to score procedural performance parameter 112 as a function of a scoring criterion. A "scoring criterion" as used in this disclosure is an attribute constraining a value of an action. A scoring criterion mat include performance parameter threshold 116 as described above. In some embodiments, a scoring criterion may include, but is not limited to, hand positioning, rate of chest compressions, depth of chest compressions, and the like. Apparatus 100 may determine a score of performance parameter 112, such as on a range of 1 to 10, a range of 1 to 100, out of 5 stars, and the like. In some embodiments, a score may include a word and/or phrase, such as, and without limitation, "good", "great", "ok", "correct", "incorrect", "perfect" and the like. In some embodiments, apparatus 100 may be configured to score procedural performance parameter 112 through a fuzzy logic system, as described below in FIG. 6

Still referring to FIG. 1, apparatus 100 may determine procedural training feedback 120 as a function of a comparison of procedural performance parameter 112 and procedural performance threshold 116. "Procedural training feedback" as used in this disclosure is information pertaining to a competency of a procedural performance. Procedural training feedback 120 may include, but is not limited to, images, text, words, sounds, and the like. In some embodiments, procedural training feedback 120 may be generated as a function of a feedback machine learning model. A feedback machine learning model may be trained with training data correlating procedural performance parameters and procedural performance parameter threshold to procedural training feedback. Training data may be received through user input, external computing devices, and/or previous iterations of processing, methods, and/or method steps as described in this disclosure. A feedback machine learning model may be configured to input procedural performance parameter 112 and/or procedural performance threshold 116 and output procedural training feedback 120. Procedural training feedback 120 may be specific to procedural performance parameter 112. For instance and without limitation, procedural performance parameter 112 may include a depth of a chest compression of 1 inch. Procedural training feedback 120 may include a suggested correction of a depth of a chest compression to at least 2 inches.

Still referring to FIG. 1, apparatus 100 may be configured to display procedural training feedback 120 through display unit 124. A "display unit" as used in this disclosure is a device having a screen. Display unit 124 may include, but is not limited to, monitors, laptops, smartphones, tablets, and the like. "Display" as used in this disclosure is any form of providing information to a user. Displaying may include, without limitation, generating computer icons and/or other visual elements. In some embodiments, apparatus 100 may be configured to generate a graphical user interface (GUI) on display unit 124. For instance and without limitation, a GUI of display unit 124 may include one or more computer icons that may be interactable through user input. Apparatus 100 may be configured to receive user input through a GUI of display unit 124. For instance and without limitation, user input may include selecting a training module, selecting a review of procedural training feedback 120, and the like.

Still referring to FIG. 1, in some embodiments, apparatus 100 may be configured to select contents and/or forms of elements to display through display unit 124, such as without limitation a GUI of display unit 124. Contents may be selected from a plurality of contents that may be displayed. Selection may include choosing contents and/or elements to improve ease of use of display 124 for a user, who may otherwise have to navigate through irrelevant documentation, use guesswork/keyword searching, and the like. In some embodiments, apparatus 100 may utilize a fuzzy logic system to select content to display through display unit 124. In some embodiments, contents displayed through display unit 124 may include guidance for a procedure. For example and without limitation, display unit 124 may display CPR guidance for a user. Contents may include, but are not limited to, procedural data, procedural performance data, procedural performance feedback, and the like. In some embodiments, apparatus 100 may utilize a content machine learning model. A content machine learning model may be trained with training data correlating procedural performance feedback data to content selection. Training data may be received through user input, external computing devices, and/or previous iterations of processing. In some embodiments, a content machine learning model may input procedural performance feedback data and output a selection of content. Apparatus 100 may use a content machine learning model to select content to display.

Still referring to FIG. 1, in some embodiments, apparatus 100 may be configured to select a guidance for a user to display through display unit 124. Guidance may include a visual form, such as without limitation icons, charts, graphs, images, videos, animations, and the like. In some embodiments, apparatus 100 may be configured to utilize a feedback form machine learning model. A feedback form machine learning model may be trained with training data correlating procedural performance feedback data to feedback forms. Training data may be received through user input, external computing devices, and/or previous iterations of processing. A feedback form machine learning model may be configured to input procedural performance feedback data and output feedback forms. Apparatus 100 may be configured to utilize a feedback form machine learning model to determine a form of feedback to display. Guidance may include procedural feedback such as, but not limited to, correct hand positions, correct chest compression form, and the like. In some embodiments, guidance may include audio and/or other feedback to convey procedural steps such as, but not limited to, chest compression rhythms. In some embodiments, guidance may include displaying verbal and/or textual information. For instance and without limitation, verbal and/or textual information may include a checklist, an order of procedural steps, and the like. Apparatus 100 may modify data displayed through display unit 124 to provide an effective form of data communication, since other displays fail to use optical data, threshold comparisons, and the like to determine display content. Apparatus 100 may use a machine learning model and/or classification model to further improve content and/or data displayed through display unit 124. In some embodiments, apparatus 100 may utilize a fuzzy logic system to determine a form to display through display unit 124. In some embodiments, apparatus 100 may use a data structure and/or database to link guidance data output by machine-learning models to contents and/or form of display.

Still referring to FIG. 1, in some embodiments, apparatus 100 may generate a user profile as a function of procedural performance parameter 112. A "user profile" as used in this disclosure is a set of data pertaining to an individual. A user profile may include, but is not limited to, procedural performance parameter data, feedback data, and/or a rating of a user. A rating of a user may be determined by a scoring of procedural performance parameter 112. In some embodiments, a rating of a user may include a CPR certification rating. For instance and without limitation, a user profile may include data showing a user has completed all training necessary to become CPR certified. As another non-limiting example, a user profile may include a rating of a user showing the user is 80% ready for CPR certification.

Figure 2:
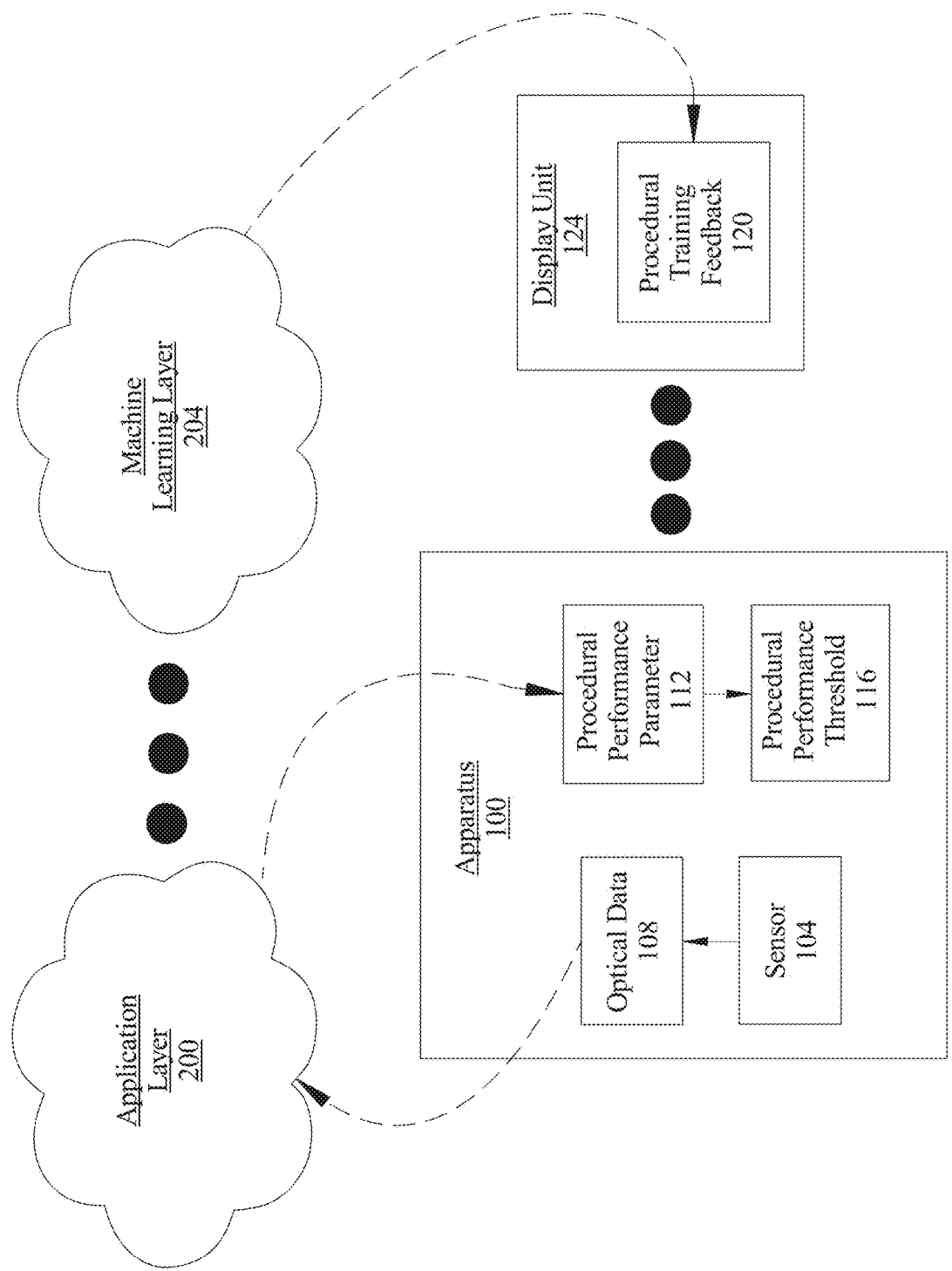
FIG. 2 illustrates another exemplary embodiment of an apparatus for procedural training.

Referring now to FIG. 2, another embodiment of apparatus 100 is presented. Apparatus 100 may be as described above in FIG. 1. In some embodiments, apparatus 100 may be configured to communicate optical data 108 to application layer 200. An "application layer" as used in this disclosure is a computer program interface. Application layer 200 may include an application programming interface (API), web interface, mobile application, and the like. A web interface of application layer 200 may be configured to determine procedural performance parameter 112 as a function of optical data 108 and communicate procedural performance data 112 to apparatus 100 and/or display unit 124. In some embodiments, application layer 200 may run on a cloud-based network, such as a remote server and/or other computing device. Application layer 200 may determine procedural performance parameter 112 as a function of optical data 108. In some embodiments, application layer 200 may be configured to provide determinations of optical data 108, such as, but not limited to, initial classifications of optical data 108. Application layer 200 may be configured to provide apparatus 100 with procedural performance parameter 112, which may be displayed on display unit 124.

Still referring to FIG. 2, in some embodiments, application layer 200 may be configured to communicate with machine learning layer 204. A "machine learning layer" as used in this disclosure is a computing device configured to run a machine learning model. In some embodiments, machine learning layer 204 may run on a cloud-based network, such as but not limited to, a remote computing device, server, and the like. In some embodiments, machine learning layer 204 may input optical data 108 and output procedural performance parameter 112. As a non-limiting example, optical data 108 may include a live video of an individual performing CPR on a test mannequin, which may be fed to machine learning layer 204 through application layer 200. Machine learning layer 204 may determine procedural performance parameter 112 to include chest compressions, hand orientations, chest compression depth, and the like. Machine learning layer 204 may be configured to run a feedback machine learning model as described above in FIG. 1. Application layer 200 may communicate optical data 108 to machine learning layer 204. Machine learning layer 204 may input optical data 108 and output procedural training feedback 120. Machine learning layer 204 may output procedural training feedback 120 through display unit 124. Apparatus 100 may utilize application layer 200 and/or machine learning layer 204 to efficiently process optical data 108 and analyze procedural performance parameter 112 to determine procedural training feedback 120 by offloading intensive computational tasks to application layer 200 and/or machine learning layer 204. In some embodiments, machine learning layer 204 may train a machine learning model and communicate the machine learning model to apparatus 100. Apparatus 100 may receive a trained machine learning model from, but not limited to, machine learning layer 204, an external computing device, and/or user input. A machine learning model may include any machine learning model as described throughout this disclosure.

Figure 3:
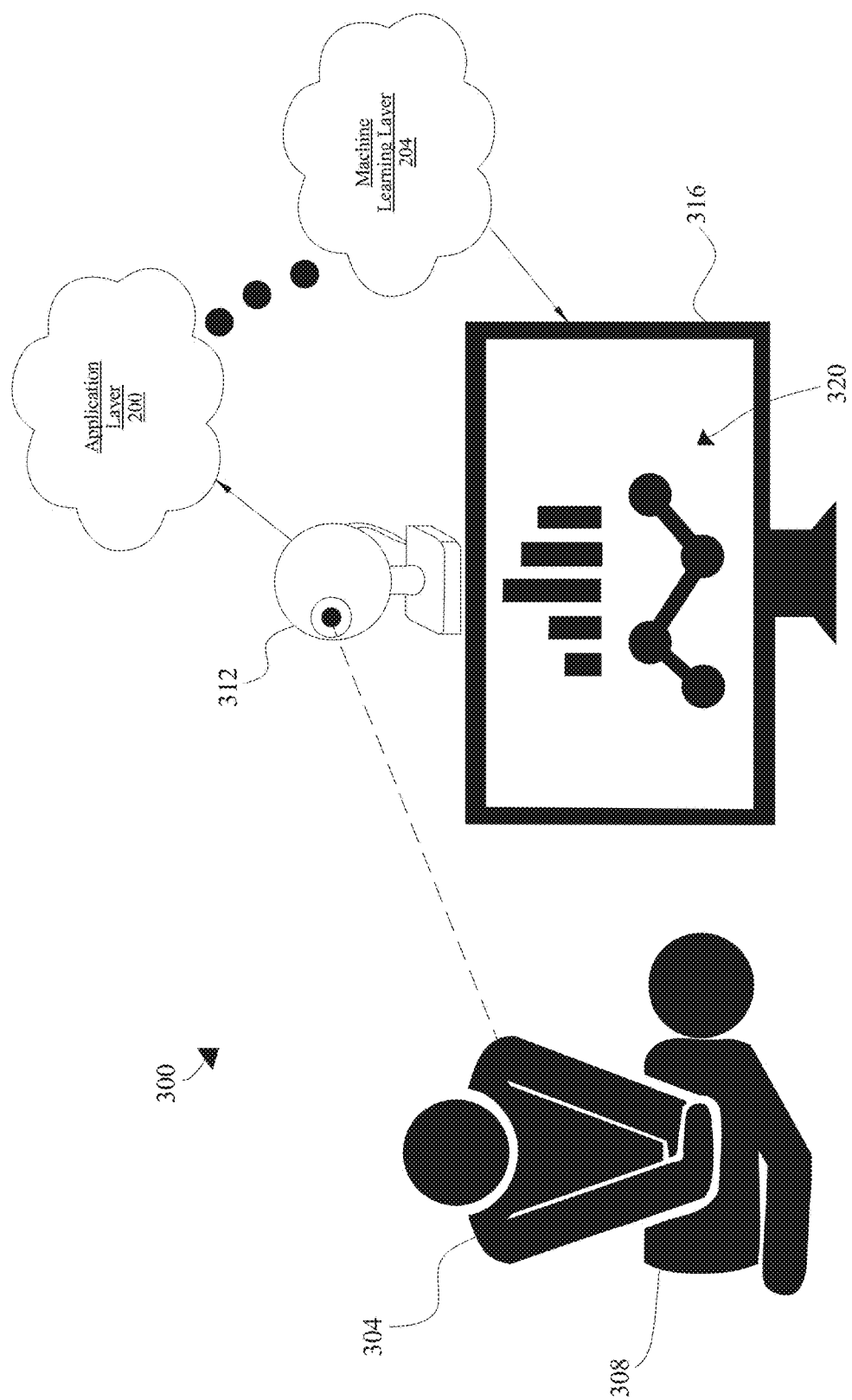
FIG. 3 is an exemplary embodiment of an apparatus of procedural training.

Referring now to FIG. 3, an embodiment of procedural training 300 is presented. Procedural training 300 may include entity 304. An "entity" as used in this disclosure is an individual. In some embodiments, entity 304 may include an individual looking to become CPR certified. In some embodiments, procedural training 300 may include two or more entities.

Still referring to FIG. 3, procedural training 300 may include test device 308. A "test device" as used in this disclosure is an apparatus for training purposes. Test device 308 may include, without limitation, an adult manikin, toddler manikin, infant manikin, and the like. In some embodiments, test device 308 may include one or more sensors, such as, but not limited to, accelerometers, gyroscopes, inertia measurement units (IMU), and the like. In some embodiments, procedural training 300 may include two or more test devices.

Still referring to FIG. 3, entity 304 may perform a procedure, such as CPR, on test device 308. Performing CPR may include, but is not limited to, checking an individual responsiveness, calling for help, positioning an individual on their back, positioning hands and/or fingers, giving chest compressions, and/or breathing into a mouth of an individual. Sensor 312 may record images and/or videos of each step of performed CPR of entity 308. In some embodiments, sensor 312 may record an entire CPR procedure from start to finish. In other embodiments, sensor 312 may record entity 308 in real time.

Still referring to FIG. 3, sensor 312 may communicate optical data to application layer 200. Sensor 312 may include, but is not limited to, a webcam, smartphone camera, laptop camera, and/or other camera. Application layer 200 may communicate optical data, procedural performance parameters, and the like to machine learning layer 204. Machine learning layer 204 may communicate procedural training feedback 320 through display unit 316. Procedural training feedback 320 may include procedural performance parameters and/or procedural performance thresholds. For instance and without limitation, procedural training feedback 320 may include a procedural performance parameter showing a rate of 90 chest compressions a minute, and a procedural performance threshold of 100 chest compressions a minute. Procedural training feedback 320 may include one or more corrective actions. A "corrective action" as used in this disclosure is a step that improves a procedure score. Corrective actions may include, but are not limited to, hand positioning, finger positioning, chest compression depth, chest compression frequency, chest compression pressure, and the like. Procedural training feedback 320 may include historical data of procedural performance parameters. In some embodiments, procedural training feedback 320 may include a ranked list of corrective actions. A ranked list may include two or more corrective actions in descending order of importance based on a procedure, For instance and without limitation, procedural training feedback 320 may display a list of corrective actions including "increase chest compression depth", "increase chest compression frequency", and "correct hand positioning". Procedural training feedback 320 may include a color coded system, such as without limitation, green representing "good", yellow representing "average", and/or red representing "bad".

Figure 4:
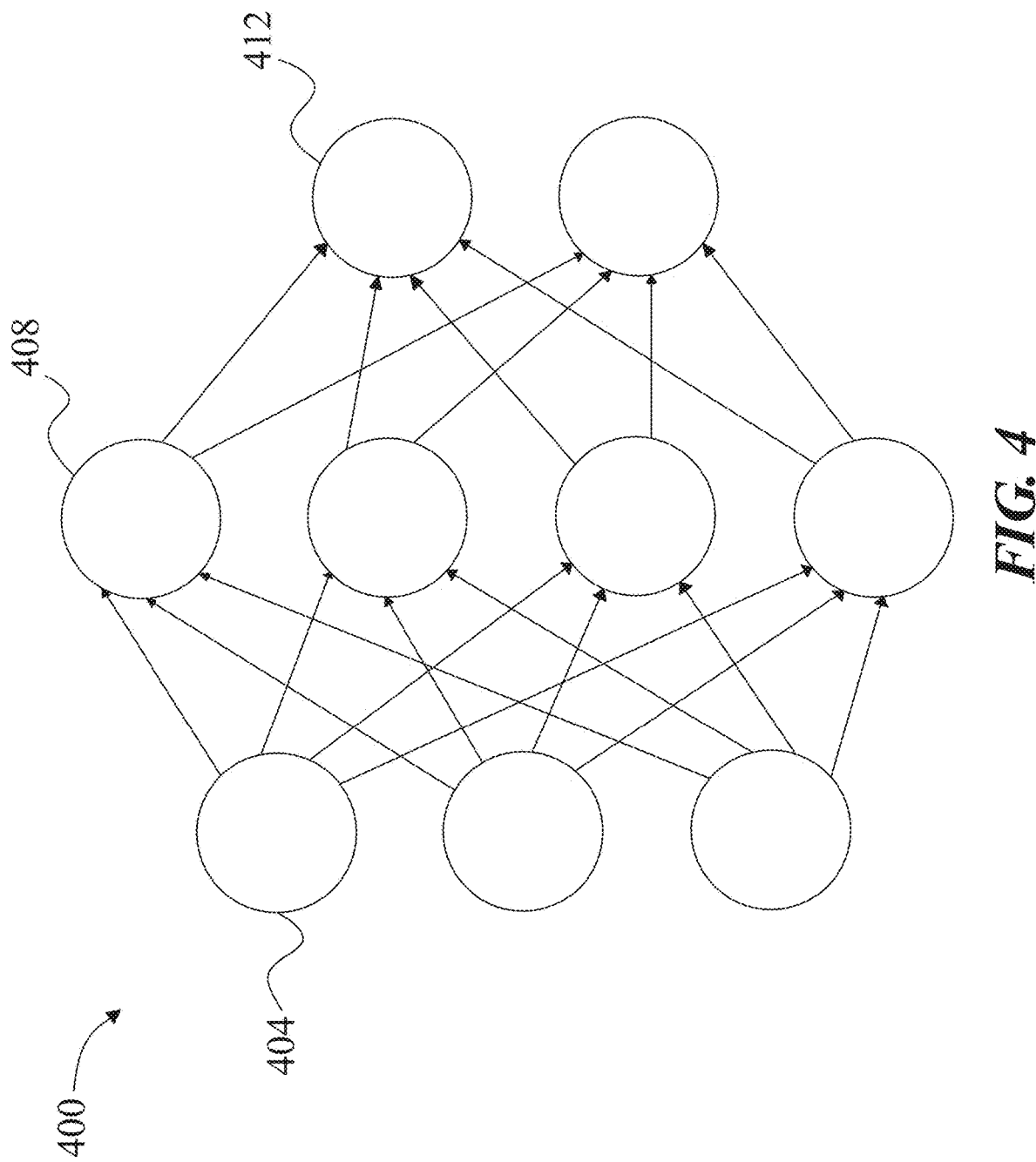
FIG. 4 is an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
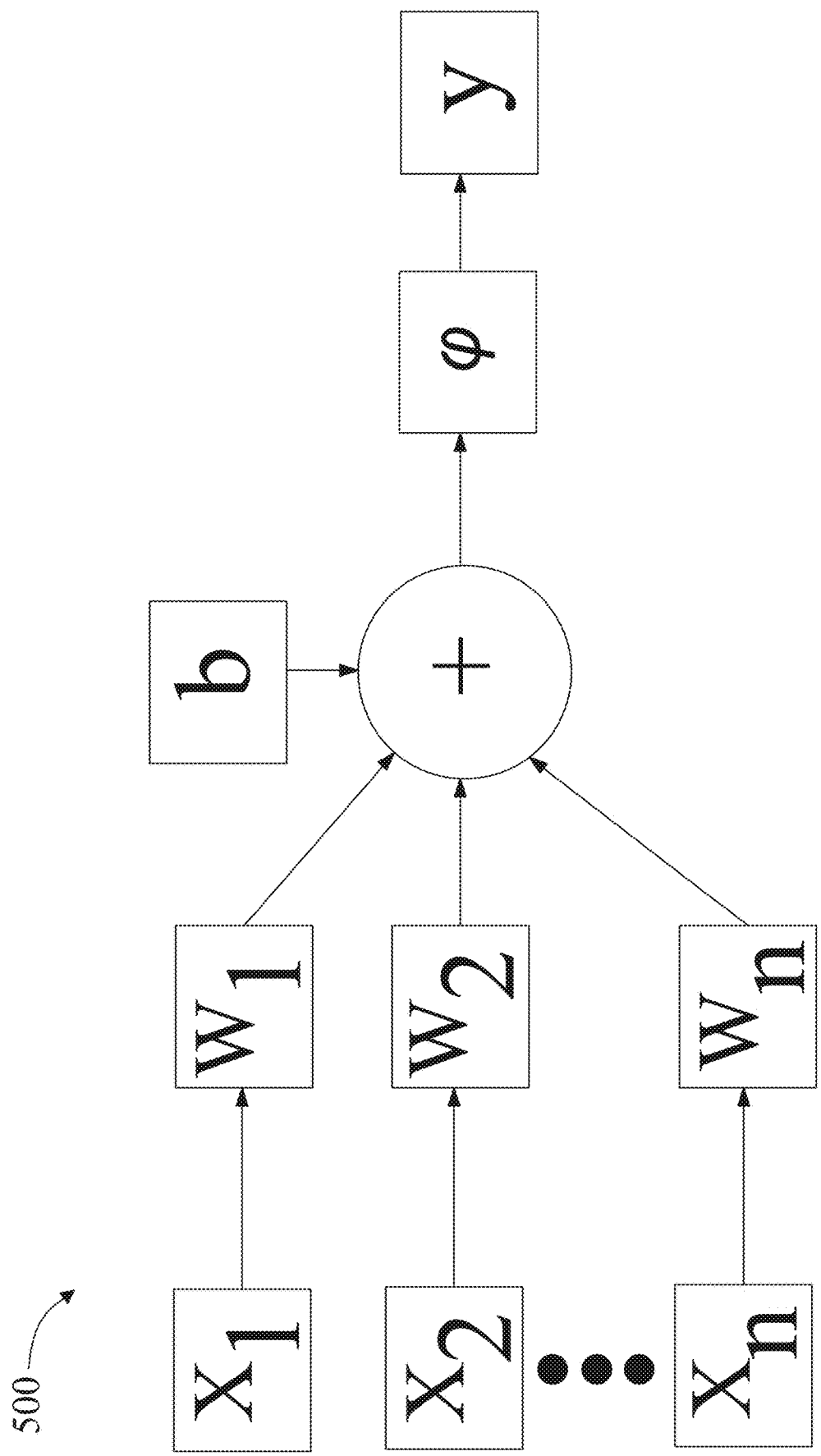
FIG. 5 is an exemplary embodiment of a node of a neural network.

Referring now to FIG. 5, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
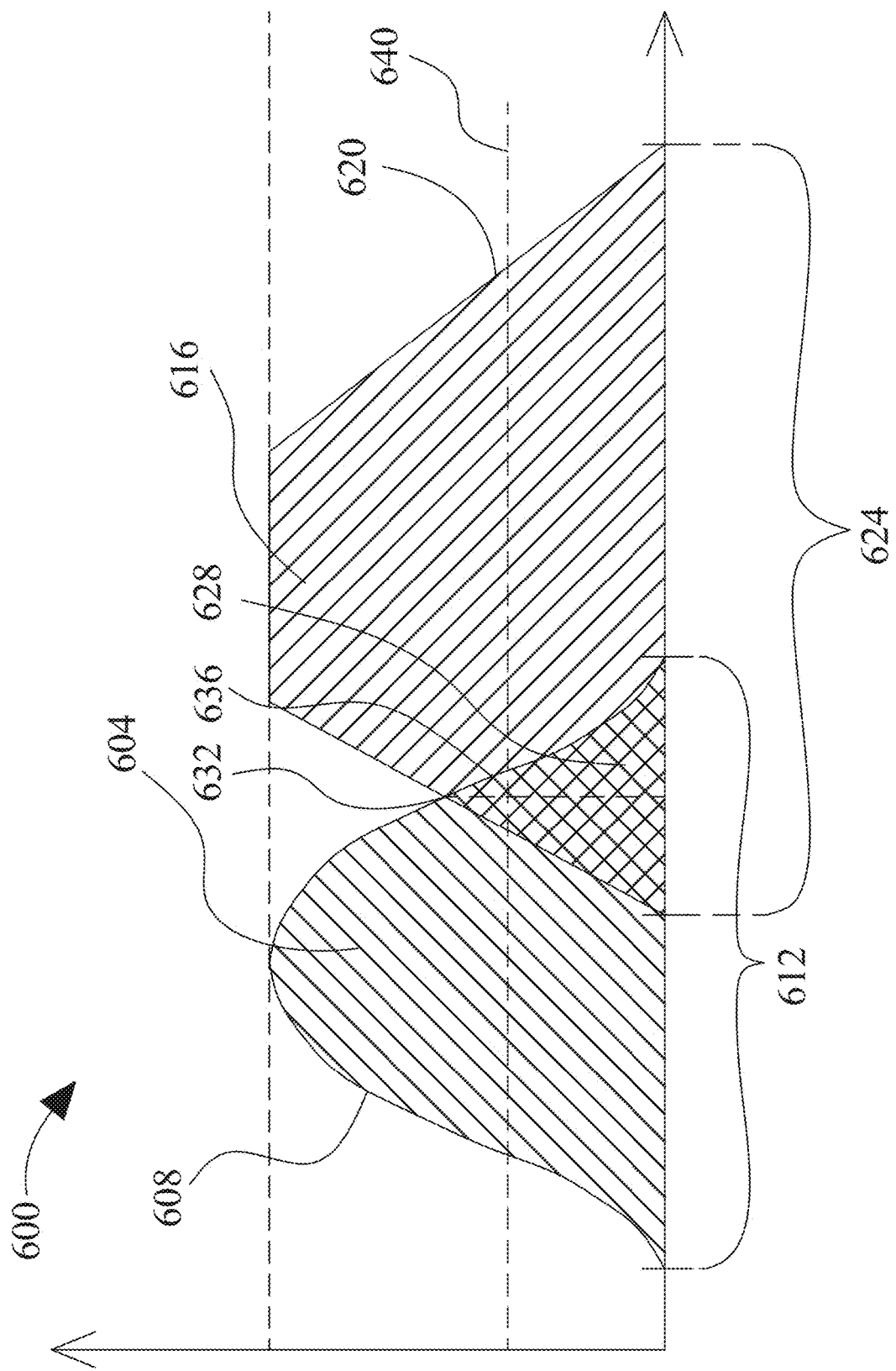
FIG. 6 is an exemplary embodiment of a fuzzy set comparison.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models and a procedural performance, parameter a predetermined class, such as without limitation competency. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or a procedural performance parameter and a predetermined class, such as without limitation competency for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify a procedural performance parameter with competency. For instance, if a procedural performance parameter has a fuzzy set matching a competency fuzzy set by having a degree of overlap exceeding a threshold, apparatus 100 may classify the procedural performance parameter as belonging to the competency fuzzy set. Where multiple fuzzy matches are performed, degrees of match for each respective fuzzy set may be computed and aggregated through, for instance, addition, averaging, or the like, to determine an overall degree of match.

Still referring to FIG. 6, in an embodiment, a procedural performance parameter may be compared to multiple competency fuzzy sets. For instance, a procedural performance parameter may be represented by a fuzzy set that is compared to each of the multiple competency fuzzy sets; and a degree of overlap exceeding a threshold between the procedural performance parameter fuzzy set and any of the multiple competency fuzzy sets may cause apparatus 100 to classify the procedural performance parameter as belonging to competency fuzzy set. For instance, in one embodiment there may be two competency fuzzy sets, representing respectively perfect competency and amateur competency. First competency fuzzy set may have a first fuzzy set; Second competency fuzzy set may have a second fuzzy set; and a procedural performance parameter may have a procedural performance parameter fuzzy set. Apparatus 100, for example, may compare a procedural performance parameter fuzzy set with each of perfect competency fuzzy set and amateur competency fuzzy set, as described above, and classify a procedural performance parameter to either, both, or neither of perfect competency fuzzy set or amateur competency fuzzy set. Machine-learning methods as described throughout may, in a non-limiting example, generate coefficients used in fuzzy set equations as described above, such as without limitation x, c, and σ of a Gaussian set as described above, as outputs of machine-learning methods. Likewise, a procedural performance parameter fuzzy set may be used indirectly to determine a fuzzy set, as a procedural performance parameter fuzzy set may be derived from outputs of one or more machine-learning models that take the procedural performance fuzzy set directly or indirectly as inputs.

Still referring to FIG. 6, a computing device may use a logic comparison program, such as, but not limited to, a fuzzy logic model to determine a performance score. A performance score may include, but is not limited to, amateur, average, competent, perfect, and the like; each such performance score may be represented as a value for a linguistic variable representing a performance score or in other words a fuzzy set as described above that corresponds to a degree of competency as calculated using any statistical, machine-learning, or other method that may occur to a person skilled in the art upon reviewing the entirety of this disclosure. In other words, a given element of a procedural performance parameter may have a first non-zero value for membership in a first linguistic variable value such as "1" and a second non-zero value for membership in a second linguistic variable value such as "2". In some embodiments, determining a performance score may include using a linear regression model. A linear regression model may include a machine learning model. A linear regression model may be configured to map data of procedural performance parameter such as chest compression data to one or more performance scores. A linear regression model may be trained using training data correlating procedural performance parameters to performance scores. A linear regression model may map statistics such as, but not limited to, highest performances, lowest performances, average performances, and the like. In some embodiments, determining a performance score of a procedural performance parameter may include using a performance score classification model. A performance score classification model may be configured to input collected data and cluster data to a centroid based on, but not limited to, frequency of appearance, linguistic indicators of performance, and the like. Centroids may include scores assigned to them such that elements of a procedural performance parameter may each be assigned a score. In some embodiments, a performance score classification model may include a K-means clustering model. In some embodiments, a performance score classification model may include a particle swarm optimization model. In some embodiments, determining a performance score of a procedural performance parameter may include using a fuzzy inference engine. A fuzzy inference engine may be configured to map one or more procedural performance parameter data elements using fuzzy logic. In some embodiments, a plurality of entity assessment devices may be arranged by a logic comparison program into performance score arrangements. A performance score arrangement" as used in this disclosure is any grouping of objects and/or data based on competency level and/or output score. This step may be implemented as described above in FIGS. 1-5. Membership function coefficients and/or constants as described above may be tuned according to classification and/or clustering algorithms. For instance, and without limitation, a clustering algorithm may determine a Gaussian or other distribution of questions about a centroid corresponding to a given competency level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. For instance, a first linguistic variable may represent a first measurable value pertaining to a procedural performance parameter, such as a degree of chest compression depth while a second membership function may indicate a degree of chest compression pressure of a subject thereof, or another measurable value pertaining to a procedural performance parameter Continuing the example, an output linguistic variable may represent, without limitation, a score value. An inference engine may combine rules, such as: "if the chest compression depth is "high" and the chest compression frequency is "high", the performance score is "great"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 6, a procedural performance parameter to be used may be selected by user selection, and/or by selection of a distribution of output scores, such as 30% amateur, 40% moderate average, and 30% perfect or the like. Each score may be selected using an additional function such as a degree of competency as described above.

Figure 7:
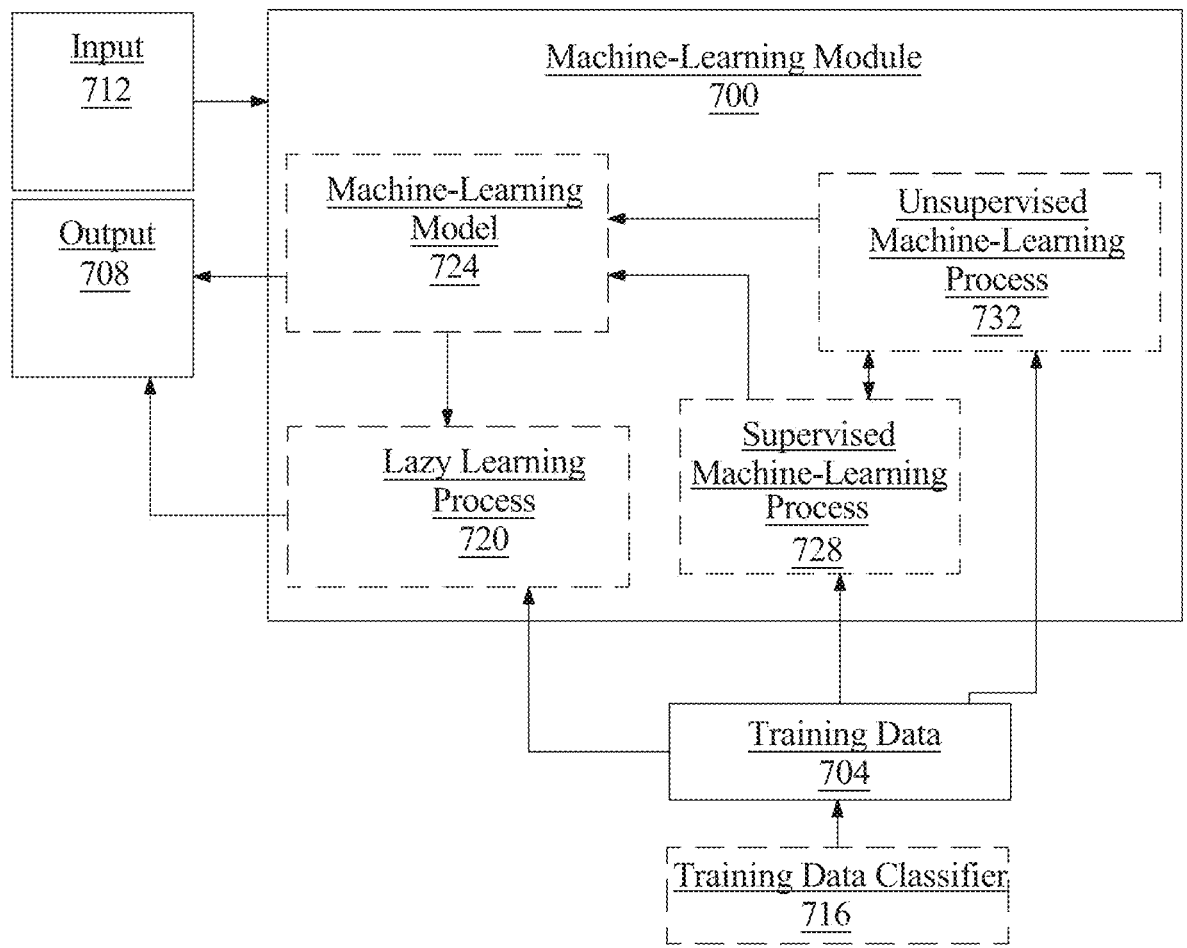
FIG. 7 is a block diagram of an exemplary embodiment of a machine learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example inputs may include procedural performance parameters and outputs may include procedural training feedback.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to pressure, depth, compression frequency, hand positioning, and the like.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include procedural performance parameters as described above as inputs, procedural training feedback as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 8:
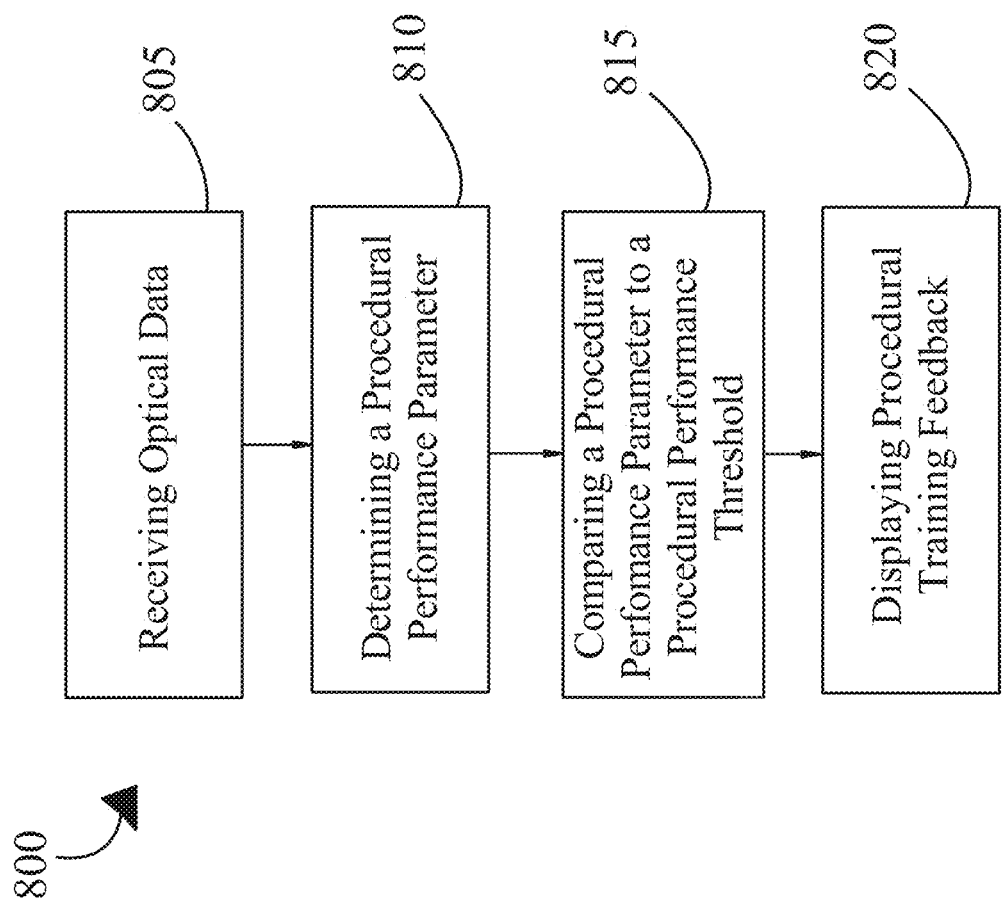
FIG. 8 is a flow diagram of an exemplary embodiment of a method of procedural training.

Referring now to FIG. 8, method of procedural training 800 is presented. At step 805, method 800 includes receiving optical data. Optical data may be generated through a sensor, such as without limitation a camera. Optical data may include, but is not limited to, colors, contrasts, blurriness, motion, and the like. This step may be implemented without limitation as described in FIGS. 1-7.

Still referring to FIG. 8, at step 810, method 800 includes determining a procedural performance parameter. In some embodiments, a procedural performance parameter may be determined as a function of optical data. In some cases, determining a procedural performance parameter includes classifying at least one object within optical data to an optical data category using an optical data classifier. In some cases, the at least one object includes a manikin. In some cases, determining a procedural performance parameter may include determining at least a first position of an object within optical data. In some cases the first position may be associated with CPR training and/or AED training. In some cases determining a first position may include determining at least one calibration checkpoint as a function of optical data. In some cases, determining, as a function of the optical data, the at least a first position of the at least one object includes identifying a marker on the object. In some cases, determining, as a function of optical data, the procedural performance parameter may further include identifying at least a second position of the at least one object within optical data, and determining the procedural performance parameter as a function of the at least a first position and the at least a second position. In some cases, the at least a first position is associated with the start of an action. In some cases, wherein at least one object includes an upper body landmark of an individual. This step may be implemented without limitation as described in FIGS. 1-7.

Still referring to FIG. 8, at step 815, method 800 includes comparing a procedural performance parameter to a procedural performance threshold. In some embodiments, comparing a procedural performance parameter to a procedural performance threshold may include generating an objective function. This step may be implemented without limitation as described in FIGS. 1-7.

Still referring to FIG. 8, at step 820, method 800 includes displaying procedural training feedback. In some embodiments, procedural training feedback may be displayed through a feedback machine learning model. Procedural training feedback may be provided through a display unit. This step may be implemented without limitation as described in FIGS. 1-7.

Still Referring to FIG. 8, method 800 may further include identifying, using machine vision system, at least one object within optical data. This step may be implemented without limitation as described in FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
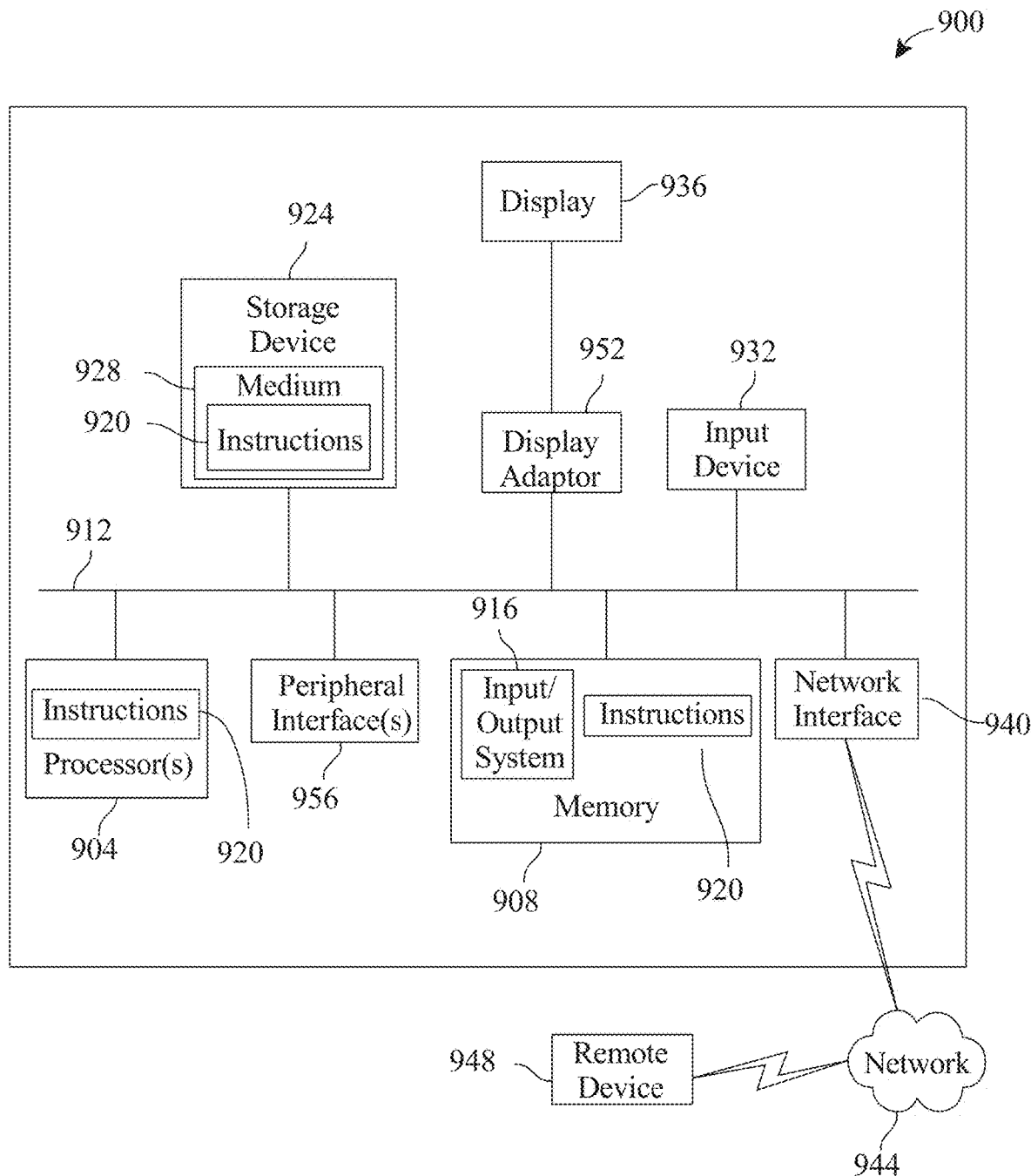
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Still referring to FIG. 9, processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 9, memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during startup, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Still referring to FIG. 9, computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Still referring to FIG. 9, computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

Still referring to FIG. 9, a user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof.

Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Still referring to FIG. 9, computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for procedural training, comprising:
  at least a processor and a memory communicatively connected to the at least a processor, the memory containing instructions configuring the at least a processor to:
    receive optical data from a sensor comprising a machine vision system in electronic communication with the at least a processor, wherein the machine vision system is configured to identify at least an object within optical data;
    generate a skeleton-based model of the least an object, wherein the skeleton-based model includes key points related to kinematic analysis;
    determine, as a function of the skeleton-based model, a medical procedure performance parameter, wherein determining the medical procedure performance parameter comprises classifying the at least one object within optical data to an optical data category using an optical data classifier and wherein determining the medical procedure performance parameter comprises:
      receiving training data correlating exemplary optical data to exemplary subgroups;
      training the optical data classifier, using the training data, to classify the optical data to one or more subgroups;
      inputting the optical data into the trained optical data classifier; and
      outputting the subgroup from the optical data classifier;
    compare the a medical procedure performance parameter to a procedural performance threshold; and
    display kinetic procedural training feedback through a display unit as a function of the comparison.

2. The apparatus of claim 1, wherein the at least one object comprises a mannikin.

3. The apparatus of claim 1, wherein determining the medical procedure performance parameter further comprises identifying at least a first position of the at least one object within optical data.

4. The apparatus of claim 3, wherein the at least a first position is associated with an action related to CPR training.

5. The apparatus of claim 3, wherein the at least a first position is associated with an action related to AED training.

6. The apparatus of claim 3, wherein determining the first position of the at least one object comprises determining at least one calibration checkpoint as a function of optical data.

7. The apparatus of claim 3, wherein determining the at least a first position of the at least one object comprises identifying a marker on the at least one object.

8. The apparatus of claim 3, wherein determining the medical procedure performance parameter further comprises:
  identifying at least a second position of the at least one object within optical data; and
  determining the medical procedure performance parameter as a function of the at least a first position and the at least a second position.

9. The apparatus of claim 3, wherein the at least a first position is associated with the start of an action.

10. The apparatus of claim 1, wherein the at least one object comprises an upper body landmark of an individual.

11. A method of using a computing device for procedural training, comprising:
  receiving optical data from a sensor comprising a machine vision system in electronic communication with the computing device,
  identifying, using the machine vision system, at least an object within optical data;
  generating, by the computing device, a skeleton-based model of the least an object, wherein the skeleton-based model includes key points related to kinematic analysis;
  determining, as a function of the skeleton-based model, a medical procedure performance parameter, wherein determining the medical procedure performance parameter comprises classifying the at least one object within optical data to an optical data category using an optical data classifier and wherein determining the medical procedure performance parameter comprises:
  receiving training data correlating exemplary optical data to exemplary subgroups;
  training the optical data classifier, using the training data, to classify the optical data to one or more subgroups;
  inputting the optical data into the trained optical data classifier; and
  outputting the subgroup from the optical data classifier;
comparing the medical procedure performance parameter to a procedural performance threshold; and
displaying kinetic procedural training feedback to a user through a display unit as a function of the comparison.

12. The method of claim 11, wherein the at least one object comprises a mannikin.

13. The method of claim 11, wherein determining the medical procedure performance parameter further comprises determining at least a first position of the object within optical data.

14. The method of claim 13, wherein the at least a first position is associated with an action related to CPR training.

15. The method of claim 13, wherein the at least a first position is associated with an action related to AED training.

16. The method of claim 13, wherein determining the first position of an object comprises determining at least one calibration checkpoint as a function of optical data.

17. The method of claim 13, wherein determining, as a function of the optical data, the at least a first position of the at least one object comprises identifying a marker on the at least one object.

18. The method of claim 13, wherein determining, as a function of optical data, the medical procedure performance parameter further comprises:
  identifying at least a second position of the at least one object within optical data; and
  determining the medical procedure performance parameter as a function of the at least a first position and the at least a second position.

19. The method of claim 13, wherein the at least a first position is associated with the start of an action.

20. The method of claim 11, wherein at least one object comprises an upper body landmark of an individual.

* * * * *